Oct. 26, 1965 J. A. MANKAWICH 3,214,513

COMMUNICATION EQUIPMENT

Filed Dec. 8, 1960 4 Sheets-Sheet 1

INVENTOR.
JOSEPH A. MANKAWICH

BY

Strauch, Nolan & Neale

ATTORNEYS

INVENTOR.
JOSEPH A. MANKAWICH
BY
Staunch Nolan + Neale
ATTORNEYS

INVENTOR
Joseph A. Mankawich

BY Strauch, Nolan & Neale
ATTORNEYS

INVENTOR
Joseph A. Mankawich

BY Strauch, Nolan & Neale
ATTORNEYS 3,214,513
COMMUNICATION EQUIPMENT

Joseph A. Mankawich, Las Vegas, Nev., assignor to SCM Corporation, Syracuse, N.Y., a corporation of New York Filed Dec. 8, 1960, Ser. No. 74,602
14 Claims. (Cl. 178—4.1)

The present invention relates to data communication channel monitoring and recording equipment and components and more particularly to communication channel monitoring and recording apparatus which will continuously monitor a communication channel and automatically actuate the recording portion of such apparatus only in response to the receipt of predetermined address indicative data peculiar to such apparatus.

This invention provides what is essentially a mechanically operated and electrically controlled rotary stepping switch for use in a telegraphic system to connect a selected station to the line when a series of predetermined signal groups are received in a predetermined sequence. It relates generally to electronic communications systems and more specifically to stepping devices used in moderate speed communications systems.

In a communications system comprising a number of stations on a common line connection, each station must have a coded call name or address in order to alert the receiving mechanism in that station to begin reception of the forthcoming message. In such a system it may be desired to send the same message simultaneously to several or possibly all of the stations on the line. This may be done by sending successively the coded signal for each station which it is desired to receive the message. The stations will thus be successively responsively connected to the line to receive the message simultaneously.

If, for example, a message was to be sent from station #1 to station #2, then the coded call letters (say "AB," for example) for station #2 would be sent in sequential order from station #1 followed by a non-sequential code letter which would break the sequential order of the incoming signals and at the same time energize a control solenoid that conditions the receiver in station #2, allowing the incoming message to be received and printed. During this operation the stepping switch is also reset.

If station #3 is to be the recipient of a message then a code signal such as "CD," followed by a non-sequential code signal would be transmitted and again, with the sequential code signal broken after receiving the letters "CD" in sequence, the connection is made to station #3 receiver and the incoming message is consequently received.

Station #2, as well as other stations on the line, will sense the code signals on the line but they will not print the incoming message because their receivers are electromechanically blocked due to the wrong sequence of the incoming signal. The control solenoids in the respective receivers are not energized and so do not unblock the machines to receive the message. Instead, the code letters for station #3 are followed by a sequence breaking signal, which causes the control solenoid in the station #3 receiver to be energized, thus conditioning its receiver to receive the forthcoming message and also resetting the stepping switch.

The present invention is unique in that it is much more compact than the loosely assembled electrical components which are usually used for the same purpose and with fewer contact surfaces, the chance of operational failure is lessened.

Also unique in this stepping switch is the use of only one electro-magnet to perform both the stepping operation and the resetting operation. Normally stepping switches or mechanisms performing stepping operations employ two electro-magnets, one for stepping and one for resetting.

Although the drawings indicate an eight position stepping switch it is understood that the switch is not necessarily so limited nor does the code letters described necessarily have to be as stated. Any letter combination will work as long as the receiver is wired to accept the code letters in the prescribed sequence.

Another unique advantage in the use of this switch and system is the fewer number of operations required because (a) each switch is so wired that the wiper arms normally rest on the contacts associated with the first signal of its code signal (it is not necessary for the switch to be stepped to this position); and (b) the next signal (which is any signal not a part of the code) will step the switch wipers to close and energizing circuit for conditioning the associated receiver to operate and also reset the switch to its normal or rest position. The illustrated embodiment of this invention is embodied in Printing Telegraph Apparatus as disclosed in United States Patent No. 2,773,931 issued December 11, 1956, to E. E. Kleinschmidt et al.

The primary object of this invention is to provide a new and structurally simple device which will respond to only a predetermined sequence of data indicative input signal groups to produce an output control signal.

More specifically is the object of the present invention to provide a stepping switch device operable only in response to a predetermined sequence of data indicative input signal groups through a predetermined sequence of operative stages to produce an output control signal and automatically operative in response to any departure of a receive signal sequence from such predetermined sequence to restore it to its initial operative state.

A further important object of this invention is to provide, in combination with a printing apparatus having a code selecting mechanism, a device operable under control of such code selecting mechanism to analyze all signals received over a connected data communication channel and suppress printing by such apparatus of all signals on such channels other than those appearing subsequent to a predetermined sequence of signals.

These and other objects of the present invention will become more fully apparent by reference to the appended claims and as the following detailed description proceeds in reference to the accompanying drawings wherein:

Figure 1:
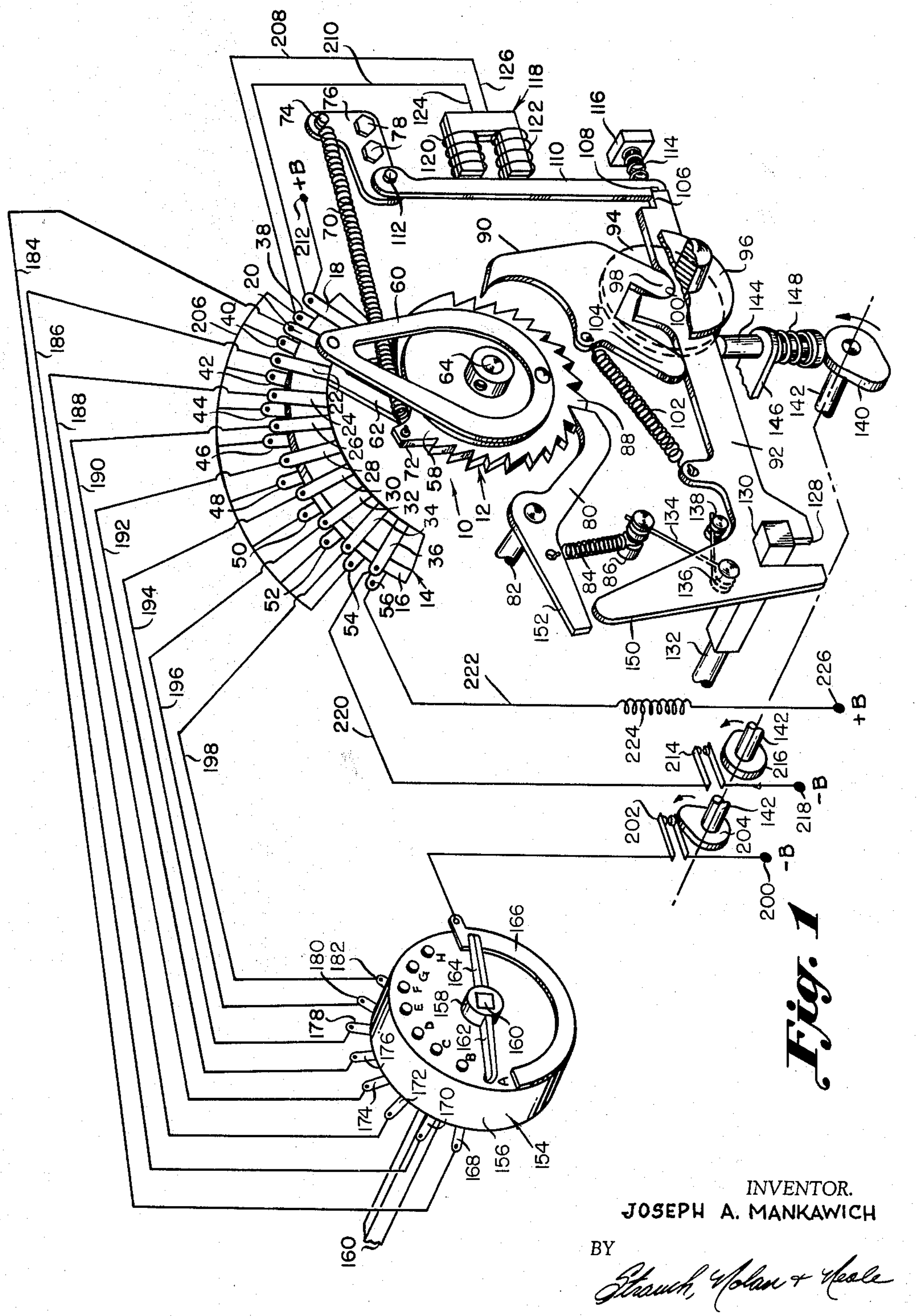
FIGURE 1 is a diagrammatic illustration of the signal monitoring equipment of the present invention.
Figure 3:
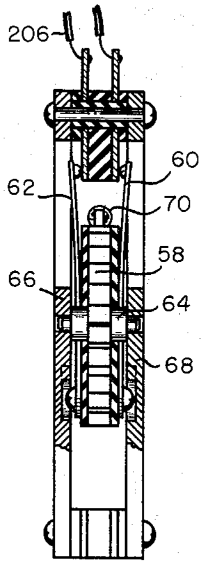
FIGURE 3 is a fragmentary sectional view through a portion of the apparatus illustrated in FIGURE 1.

Referring now to FIGURE 1 in detail, the stepping switch 10 of the present invention comprises a movable element 12 and a fixed element 14. The fixed element 14 embodies an arcuate insulator strip 16 on one side face of which is fixed a series of electrical contact elements 18–36 and on the opposite face of which is fixed a further series of contact elements 38–56. The movable element 12 comprises a ratchet wheel 58 and a pair of contact elements 60 and 62 fixed thereto. Contact elements 60 and 62 are electrically interconnected through but electrically insulated from the ratchet wheel 58. Ratchet wheel 58 is mounted for pivotal movement upon a shaft 64 journalled upon the frame of the machine 66 and 68 as is best shown in FIGURE 3. Shaft 64 is concentric with the center of the arcuate strip 16 so that, as the ratchet wheel 58 is advanced step by step, contact element 60 will successively contact contact elements 20–36 and contact element 62 will successively contact contact elements 40–56. Ratchet wheel 58 is resiliently biased in a clockwise direction as viewed in FIGURE 1 by a spring 70 fixed at one end to a lug 72 on ratchet wheel 58 and at its opposite end to a spring stud 74 fixed to a bracket 76 which is attached to the frame by mounting screws 78. The rotation of ratchet wheel 58 in a clockwise direction under the influence of the biasing force of spring 70 is normally prevented by the engagement of a detent pawl 80 pivotally mounted by a rock shaft 82 upon the frame and biased in a counterclockwise direction about the axis of the shaft 80 into engagement with the teeth of the ratchet wheel 58 by a spring 84 attached at its opposite end to a frame mounted spring stud 86. A radially elongated tooth 88 on ratchet wheel 58 establishes the limit of clockwise movement of ratchet wheel 58 in cooperation with the detent pawl 80 as will be explained presently.

Ratchet wheel 58 is advanced step by step in a counterclockwise direction in opposition to the biasing force of the spring 70 by a stepping pawl 90. Stepping pawl 90 is supported upon a lever 92, being laterally confined between a pair of discs 94 and 96 fixed to the frame and having a projecting lug 98 pivotally engaged with a deep notch 100 in the top surface of the lever 92. Stepping pawl 90 is biased in a counterclockwise direction about this pivot on lever 92 by a spring 102 against a stop defined by the engagement of the lug 104 with the top surface of the lever 92 as shown.

The right hand end of the lever 92 is normally constrained from movement by the engagement of its projecting latch surface 106 with a mating latch surface 108 on an electromagnet armature 110 pivoted at 112 upon the bracket 76. Armature 110 is resiliently biased toward the adjacent end of lever 92 about the pivot 112 by a spring 114 which is compressed between the armature 110 and a portion of the frame indicated at 116. Armature 110 cooperates with and is positioned under control of an electromagnet 118 having series connected coils 120 and 122 and input leads 124 and 126. When electromagnet 118 is energized, armature 110 is pivoted in a counterclockwise direction about the pivot 112 in opposition to the biasing force of spring 114 to disengage the latching surfaces 106 and 108 to free the right hand lever 92 from restraint.

At its left hand end, lever 92 is provided with a downwardly extending slot 128 embracing a square cross-sectioned portion 130 of a pivotally mounted shaft 132. The left hand end of the lever 92 is biased downwardly to the position shown by a spring 134 attached to lever 92 by a spring stud 136 and to the frame by a spring stud 86 and 138.

Lever 92 is actuated intermediate its ends by a cam 140 fixed to a continuously rotating shaft 142, corresponding to the function cam shaft of said Kleinschmidt et al. patent. As cam 140 rotates, it lifts an operating bail number 144 which is slidably mounted in a portion of the frame 146 and resiliently biased downwardly by a compression spring 148 surrounding the depending portion of the bail 144 beneath the frame portion 146.

So long as electromagnet 118 is de-energized and armature 110 is in engagement with the right hand end of the lever 92, rotation of cams 140 will impart limited pivotal movement of lever 92 about the pivot defined by the engagement of the latching surfaces 106 and 108 in opposition to the biasing force of spring 134. During such movement, the stepping pawl 90 will not engage the teeth of the ratchet wheel 58. When electromagnet 118 is energized to release the latching engagement of armature 110 with the right hand lever 92, lever 92 will pivot with shaft 132 about the axis of shaft 132. Pivotal movement of the lever 92 about the axis of the shaft 132 will cause the stepping pawl 90 to engage the aligned one of the teeth of the ratchet wheel 58 to advance the ratchet wheel 58 one step in a counterclockwise direction in opposition to the biasing force of spring 70. As ratchet wheel 58 is advanced in the counterclockwise direction, the detent pawl 80 will ratchet over a tooth of the ratchet wheel 58 to engage the next adjacent tooth and prevent reverse rotation of the ratchet wheel 58 as the pawl 90 is restored with lever 92 to its lower position.

Lever 92 is provided with an upstanding arm 150 which, when lever 92 pivots about its right hand end, engages a projecting arm 152 of the pawl 80. Engagement of the arms 150 and 152 causes pawl 80 to pivot in a clockwise direction from engagement with the teeth of the ratchet wheel 58 but not sufficiently to prevent its engagement with tooth 88 and thus permits the ratchet wheel 58 to rotate in a clockwise direction under the influence of spring 70 until the pawl 80 engages the larger tooth 88.

In summary, lever 92 will be pivoted about one of its ends during each revolution of the cam 140. So long as electromagnet 118 remains de-energized, the detent pawl 80 will be pivoted slightly during each revolution of cam 140 but will remain in engagement with the large tooth 88. If electromagnet 118 is energized during a revolution of the cam 140, the ratchet wheel 58 will be advanced one step in a counterclockwise direction. If the electromagnet 118 is energized during the next suceeding revolution of the cam 140, ratchet wheel 58 will be advanced a second step in a counterclockwise direction. If, however, during the second revolution of cam 140, electromagnet 118 is not energized, pawl 80 will be actuated to release the ratchet wheel 58 for restoration to its clockwise limit position under the influence of spring 70.

The control of the operation of the stepping switch 10 by electromagnet 118 is effected by a selector commutator switch assembly 154 comprising a stator 156 and a rotor 158 fixed to a shaft 160 corresponding to the square selecting shaft of the aforesaid Kleinschmidt et al. patent. During each revolution of function cam shaft 142, shaft 160 is angularly positioned, under the control of a code selecting mechanism, in accord with the significance of code signal group received during the preceding revolution of shaft 142 and has a distinct angular position for each distinct code signal group. For simplicity, but seven of these positions are illustrated and indicated by the contacts A–H. When the code signal A is received, one of the wiper arms 162 or 164 of the rotor 158 will be in engagement with the contact A and the other of those arms will be in engagement with common arcuate strip 166. When the code signal B is received, one of the arms 162 or 164 will be in contact with the contact B and the other with the common strip 166 and so forth. Contacts A through H are electrically connected to terminal tabs 168–182 inclusive.

Terminal tabs 168 through 182 inclusive are connected by the leads 184 through 198 inclusive to the contact element 20–34 respectively of the fixed portion 14 of the stepping switch 10. The arcuate common strip 166 is connected to one side of a D.C. power source at 200 through a switch 202 actuated by a cam 204 fixed to the continuously rotating function cam shaft 142. Cam 204 will thus close contacts 202 once during each revolution of the function cam shaft 142 in timed relation with the operation of the cam 140 on the shaft 142 which controls the pivotal movement of the lever 92. Contact elements 38–54 are connected in common by a lead 206 and contact element 38 is connected by a lead 208 to the input lead 126 of the electromagnet 118. The output lead 124 of the electromagnet 118 is connected by a line 210 to the contact element 18 as a terminal and to the opposite side of the D.C. source indicated by the terminal 212. By this construction, the stepping switch 10 is adapted to respond to a series of eight successive signals A, B, C, D, E, F, G, and H. If those eight signals are received in sequence and in that order, the ratchet wheel 58 will be advanced eight steps in eight successive revolutions of the function cam shaft 142. If there is any departure from that exact sequence of eight signals A–H in succession, the clockwise step by step advance of the ratchet wheel 58 will be interrupted and ratchet wheel 58 will be restored to its initial position as shown in FIGURE 1.

Assuming that the signals A–H have been received in that sequence, the contact element 60 will be in engagement with the contact element 36 and the contact element 62 will be in engagement with the contact element 56. During the revolution of the function cam shaft 142 in which ratchet wheel 58 was advanced to this position, a pair of contacts 214 will be closed by a cam 216 fixed to the function cam shaft 142 to close a circuit from the negative side of a D.C. source indicated by the terminal 218 through the contact 214, through a lead 220 to contact element 36 through contact elements 60 and 62 to contact element 56, through a lead 222 and the coil 224 of a solenoid to the opposite side of that D.C. source indicated by the terminal 226. Energization of the solenoid 224 will be effective to actuate the associated printing mechanism to record the message received subsequent to the address indicative signals A–H inclusive. During the revolution of the function cam shaft 142 subsequent to that in which the contact elements 60 and 62 were positioned to contact contact elements 36 and 56 respectively, lever 92 will be pivoted about its right hand end to actuate pawl 80 to release the ratchet wheel 58 to restore to its home position as shown in FIGURE 1.

Figure 2:
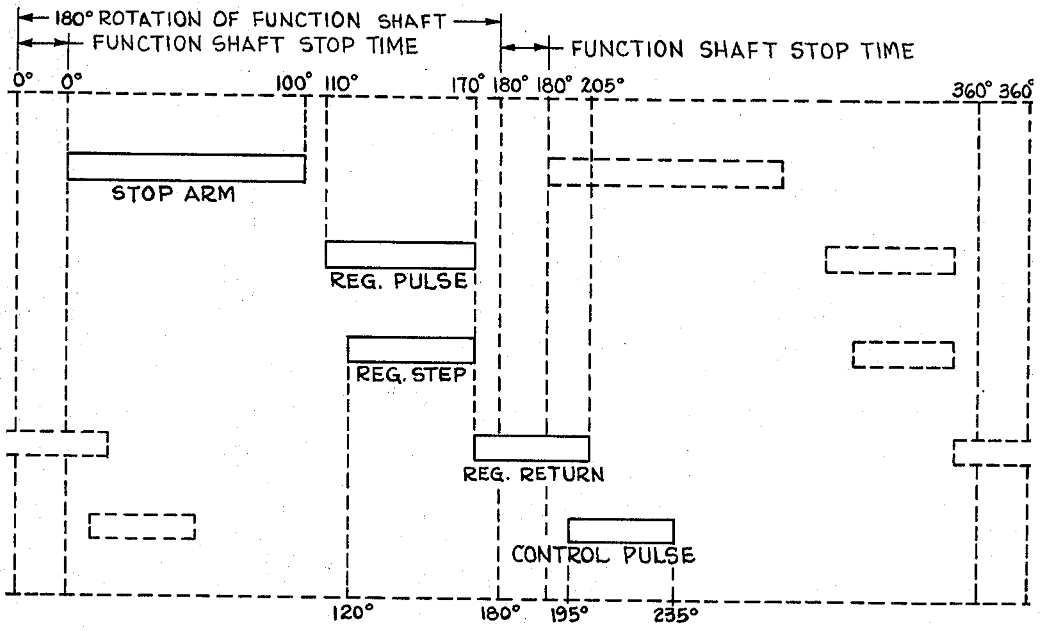
FIGURE 2 is a timing diagram of the operation of the device illustrated in FIGURE 1.

The exact timed relation of the components of the mechanism shown in FIGURE 1 are illustrated in detail in FIGURE 2.

The energization of solenoid 224 is effective to condition the printer to record the message received subsequent to the predetermined call designation or address in the illustrated embodiment—A, B, C, D, E, F, G, H. It will be appreciated that by changing the connections of the leads 184–198 to the terminals 168–182 of the commutator 154, the sequence of the call letters can be varied as desired. Further, it will be appreciated that by shifting the connections 220 and 222, the number of letters required in the call sequence can be varied. For example, by connecting lead 220 to connection 24 and lead 222 to connection 44 and elimination of the leads 188–198, the stepping switch 10 will actuate the solenoid 224 after receipt of the letters A and B in that sequence. If the leads 184 and 186 are interchanged in their connections to terminals 168 and 170 so that 184 is connected to 170 and 186 to 168, the stepping switch will be responsive only to the call designation BA. If more than an eight unit call code is required, it is merely necessary to increase the number of the stationary contacts of the stator unit 14 and the associated interconnections.

In the apparatus of the aforesaid Kleinschmidt et al. patent, printing function selection and actuation and carriage feed occur automatically upon the receipt of the proper code signal groups. To adapt that apparatus to the purposes of the present invention, it is necessary to selectively divorce those operations from the operation of the code selection mechanism so that the code selection mechanism can operate the selector commutator 154 without actuating the printing mechanism, the various functions or the carriage feed mechanism. For this purpose, certain modifications, about to be described, are made in the apparatus in the aforesaid Kleinschmidt et al. patent so that the function cam shaft corresponding to shaft 142 can rotate continuously and the square selecting shaft corresponding to shaft 160 can be moved normally under control of all incoming signal groups while printing, carriage feed and function operation are suppressed and so that these suppressed operations become automatically operative upon receipt of the proper predetermined sequence of signals, constituting the call letters for the particular printer, to actuate the unblocking solenoid 224.

For simplicity only such portions of the apparatus of the aforesaid Kleinschmidt et al. patents as are essential to the modification will be herein shown and described, reference to said patent being for details of the operation of such apparatus.

Figures 4, 9:
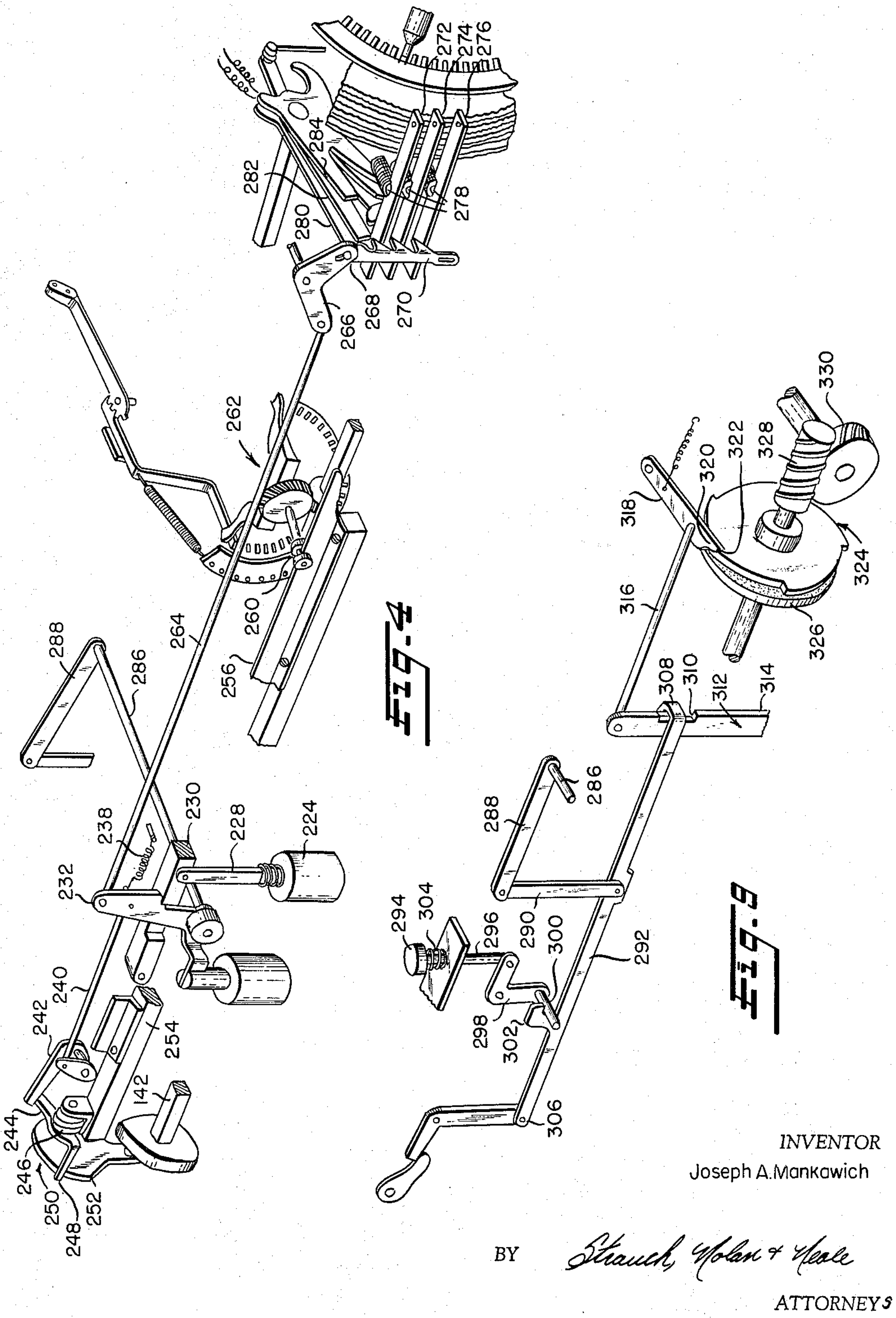
FIGURE 4 is a fragmentary perspective view of a printing apparatus adapted for control in cooperation with the monitoring apparatus of FIGURE 1.
FIGURE 9 is a perspective fragmentary view of the carriage feed mechanism of the printing apparatus of FIGURE 4.

FIGURE 4 is a view from the rear of the printer and shows the mechanism in the blocked condition which is the normal condition of the teletypewriter. Therefore, the following text will describe the unblocking of the different functions of the machine.

Figure 5:
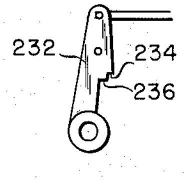
FIGURE 5 is a fragmentary view of a portion of the mechanism of FIGURE 4.
Figure 6:
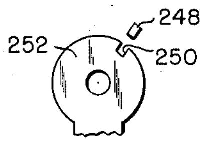
FIGURE 6 is a fragmentary end view of the portion of the mechanism of FIGURE 4.
Figure 7:
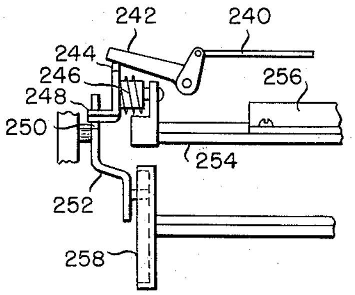
FIGURE 7 is a fragmentary rear elevational view of the portion of the mechanism of FIGURE 4.

The signal comes in on the line through the code cage 2 and an instant later registers on the sequence register switch 10. If the proper call letters for this machine are received then the unblocking solenoid 224 is energized, unblocking the different functions and allowing the machine to receive the incoming message. With the energizing of the unblocking solenoid 224, link 228 is pulled down and this in turn pulls latch bar 230 down also. Instantly, lever 232 moves clockwise out of notch 234 (FIGURE 5) into notch 236 assisted by spring 238. Connecting rod 240 moves to the right causing bellcrank 242 to rotate clockwise which, in turn, causes lever 244 to rotate clockwise also biased by spring 246. End 248 of lever 244 rotates down into notch 250 of cam follower 252 (see also FIGURES 6 and 7). Thus, with lever 244 being securely attached to print shaft 254 and the print bail 256 being attached to print shaft 254 also, the machine now can print due to the fact that print cam 258, fixed to function cam shaft 142, causes a wobble in the cam follower 252 which imparts a rocking motion to the print bail 256 and being interlocked at point 260 with the type selecting mechanism 262 causes a printing operation to be performed in the normal manner as is fully described in the aforesaid Kleinschmidt et al. patent.

Figure 8:
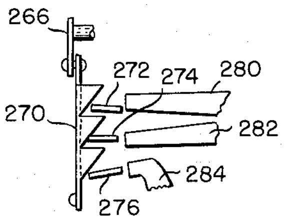
FIGURE 8 is a fragmentary right end view of the mechanism of FIGURE 4.

As lever 232 moves clockwise, connecting rod 264 moves to the right and being connected to bellcrank 266, moves bellcrank 266 in a counterclockwise direction. End 268, being connected to cam slide 270 moves the cam slide 270 upward, unblocking line feed stop bar 272, carriage return stop bar 274 and figures stop bar 276. When these three bars are unblocked, springs 278 force the bars 272, 274 and 276 out of the paths of the corresponding levers 280, 282 and 284 allowing them to pass and thereby unblocking the function selecting mechanism as shown in FIGURE 8 for normal operation as fully described in the aforesaid Kleinschmidt et al. patent.

Figure 10:
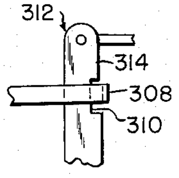
FIGURES 10 and 11 are fragmentary views illustrating two operative positions of a portion of the mechanism of FIGURE 9.
Figure 11:
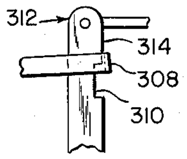

In the carriage feed mechanism (FIGURE 9) unblocking is accomplished in the following manner. Connecting rod 286 (FIGURES 5 and 9), attached to lever 232, rotates in a clockwise direction with lever 232 and this action rotates lever 288 (at the opposite end of connecting rod 286) in a clockwise direction also. Lever 288 pulls connecting link 290 upward which, in turn, pulls the carriage feed link 292 up also. The next step is actually accomplished through electro-mechanical means in normal operation but for clarity it is shown in the drawing in FIGURE 7 as a manual device. We refer to button 294 which when depressed forces rod 296 down and it, being attached to bellcrank 298, moves the bellcrank 78 in a clockwise direction. This causes stud 300 to move clockwise also and being interlocked with the hook 302 on carriage feed link 292, moves the carriage feed link to the left. Push button 294 is immediately returned to normal by a spring 304. End 306 of carriage feed link 292 is attached to the spacing mechanism and the carriage feed link 292 is actuated by this mechanism in normal electro-mechanical operation. In the blocked condition, hooked end 308 of carriage feed link 292 is centered on notch 310 of lever 312 as shown in FIGURE 10. Thus when carriage feed link 292 shifts to the left it does not move lever 312. To unblock the carriage feed mechanism, lever 290 moves the carriage feed link 292 upward until hooked end 380 is no longer aligned with notch 310 but is hooked to surface 314 of lever 312 as shown in FIGURE 11. Now when carriage feed link 292 moves to the left, hooked end 308 pulls lever 312 in a counterclockwise direction and this, in turn, pulls connecting rod 316 to the left and it being attached to blocking lever 318, moves blocking lever 318 in a leftwardly direction until end 320 of blocking lever 318 is moved out of the path of tooth 322 of sprocket 324. Immediately clutch 326 takes over and rotates the sprocket 324 one position and through worm 328 and gear 330 which are directly attached to the power carriage feed as described in column 31—"Power Carriage Feed," of the aforesaid Kleinschmidt et al. patent.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, a rotary stepping switch having a plurality of arcuately disposed stationary contacts and a movable contact adapted to contact said stationary contacts in sequence, an electro-magnetic control means and a cam actuated stepping mechanism for advancing said movable contact one step in a first direction from a predetermined position each time the cam actuation and electromagnetic control occur in synchronism and for restoring said movable contact to its home position each time the cam actuation and electromagnetic control do not occur in synchronism.

2. In combination, a stepping switch having a plurality of stationary contacts and a movable contact adapted to contact said stationary contacts in sequence, an electromagnetic control means and a cam actuated stepping mechanism for advancing said movable contact one step in a first direction from a predetermined home position each time the cam actuation and electromagnetic control occur in synchronism and restoring said movable contact to its home position each time the cam actuation and electromagnetic control do not occur in synchronism.

3. The combination defined in claim 2 wherein said mechanism comprises a spring biased ratchet movable with said movable contact, a detent and a pawl cooperating with said ratchet to control the position thereof, a cam actuated member alternatively operable to actuate said pawl and release said detent, and electromagnetic means for controlling the alternative operation of said member.

4. The combination defined in claim 3 wherein said member is rockably and slidably mounted at one end, releasably pivoted under control of said electromagnet means at the other, and cam actuated intermediate its ends; said member being operative to actuate said pawl when pivoted about said one end and to actuate said detent when pivoted about said other end.

5. In combination with a data indicative signal group decoding device, a normally inoperative recording device operative when activated to produce under control of said decoding device a record of each signal group decoded by said decoding device, and means for monitoring all signal groups decoded by said decoding device and for activating said recording device only in response to the decoding of a predetermined sequence of signal groups by said decoding device, said last named means comprising a mechanical stepping device operable through a succession of stable states and operative at the completion of such succession of steps to produce an output signal to activate said recording device, and signal sequence selector means operatively interposed between said decoding device and said stepping device to permit advancing action of said stepping device for each decoded signal group so long as the signals decoded follow a predetermined sequence and to initiate restoring action of said stepping device upon any departure of the succession of decoded signal groups from said predetermined sequence.

6. In combination with a normally inoperative recording device, a data indicative signal group responsive decoding device operable to produce a distinct output for each of a plurality of distinct signal groups, means controlled by the output of said decoding device for producing an output signal only in response to a predetermined plurality of output signals from said device appearing in a predetermined sequence, and means operable in response to an output from said last named means for actuating said recording device under control of said decoding device, said last named means comprising a mechanical stepping device operable through a succession of stable states and operative at the completion of such succession of steps to produce an output signal to activate said recording device, and signal sequence selector means operatively interposed between said decoding device and said stepping device to permit advancing action of said stepping device for each decoded signal group so long as the signals decoded follow a predetermined sequence and to initiate restoring action of said stepping device upon any departure of the succession of decoded signal groups from said predetermined sequence.

7. In combination with a telegraph printer having a data indicative signal group decoding mechanism, a normally inoperative printing mechanism operable when operative to produce under control of said decoding mechanism a printed record of the significance of the signal groups decoded by said decoding mechanism, and means for monitoring the output of said decoding mechanism and for actuating said printing mechanism only in response to the decoding of a predetermined sequence of signal groups by said decoding device, said last named means comprising a mechanical stepping device operable through a succession of stable states and operative at the completion of such succession of steps to produce an output signal to activate said printing mechanism, and signal sequence selector means operatively interposed between said decoding and said stepping devices to permit advancing action of said stepping device for each decoded signal group so long as the signals decoded follow a predetermined sequence and to initiate restoring action of said stepping device upon departure of the succession of the coded signal groups from the predetermined sequence.

8. In combination with a telegraph printer having a data indicative signal group decoding mechanism, a normally inoperative printing mechanism operable when operative to produce under control of said decoding mechanism a printed record of the significance of the signal groups decoded by said decoding mechanism, and means for monitoring the output of said decoding mechanism and for actuating said printing mechanism only in response to the decoding of a predetermined sequence of signal groups by said decoding device, said decoding device having an output shaft angularly positionable at a plurality of distinct positions each indicative of a distinct signal group, and said monitoring means comprising a commutator driven by said output shaft and operable to produce a plurality of distinct output signals at each of a like plurality of distinct angular positions of said shaft, and a stepping switch connected to said commutator and operable to a plurality of steps but only in response to the production by said commutator of a predetermined plurality of output signals in a predetermined sequence.

9. In combination, a stepping switch having a plurality of stationary contacts, a movable contact, and a movable contact positioning means including an electromagnet; a signal decoding device having a common input connection and a plurality of distinct electrical output connections individually connected to said common input in accord with the operation of said decoding device; means connecting each of a predetermined plurality of said stationary contacts to a predetermined one of said output connections; means connecting one terminal of said electromagnet to said movable contact; and means for periodically applying an electrical potential between said common input and the other terminal of said electromagnet in timed relation to the operation of said decoding device whereby said electromagnet will be energized only if said movable contact is in engagement with the stationary contact connected to the output connection connected to said common input by said decoding device.

10. The combination defined in claim 9 wherein said positioning means includes a cam operative in synchronism with said decoding device and said potential applying means, and means actuated by said cam and controlled by said electromagnet for advancing said movable contact in steps in one direction from a predetermined home position each time said electromagnet is energized and for restoring said movable contact to its home position each time said electromagnet is not energized.

11. In combination, a stepping device operable through a succession of stable states from an initial state in a predetermined sequence comprising: first means providing sequential inputs; second means providing sequential inputs; third mechanical means actuated by each input from said first means to either advance said stepping device one step per input or enable said stepping device to remain in or, if advanced, be restored to its initial condition; said third means including means rendered operative to advance said stepping device so long as said sequential inputs are in coincidence and further including means rendered operative for enabling said stepping device to remain in or, if advanced, be restored to its initial state whenever an input from said first means occurs in the absence of a coincident input from said second means.

12. In combination with a data indicative signal group decoding device, a normally inoperative recording device operative when activated to produce under control of said decoding device a record of each signal group decoded by said decoding device, means for monitoring all signal groups decoded by said decoding device and for activating said recording device only in response to the decoding of a predetermined sequence of signal groups by said decoding device, said last named means comprising a stepping device operable through a succession of stable states from an initial state in a predetermined sequence and having a pair of inputs, one of said inputs being periodic and the other of said inputs being aperiodic, means for advancing said stepping device through said succession of stable states in said predetermined sequence so long as said inputs occur in synchronism and for restrong said stepping device to its initial state whenever said pair of inputs do not occur in synchronism, and signal sequence selector means operatively interposed between said decoding device and the aperiodic input to said stepping device to apply an input signal thereto in synchronism with the application of periodic signals to the other of said inputs for each decoded signal group so long as the signals decoded follow a predetermined sequence.

13. In combination, a stepping device having a succession of stable states; a sequentially actuated first means including means selectively capable of two distinct actions, one action advancing said stepping device and the other action enabling said stepping device to remain in or if advanced to be restored to its initial condition; and second means having operative and inoperative states and permitting said first means to impart said advancing action when one of said states is in coincidence with the actuation of said first means and to impart said enabling action when the other of said states is in coincidence with the actuation of said first means wherein at least one of said first and second means is mechanical.

14. In combination, a stepping device operable through a succession of stable states from an initial state in a predetermined sequence, a pair of inputs, one of said inputs being periodic and mechanical and the other said input being aperiodic and electrical, means connecting said inputs to said stepping device, and means for advancing said stepping device through said succession of stable states in said presdetermined sequence so long as said inputs occur in coincidence and for restoring said stepping device to its initial state whenever said pair of inputs do not occur in coincidence.

References Cited by the Examiner

UNITED STATES PATENTS

| | | | |
|---|---|---|---|
| 1,569,450 | 1/26 | Bohlman | 179—27.51 |
| 2,068,726 | 1/37 | Wochlinger | 179—18 |
| 2,404,047 | 7/46 | Flory et al. | 328—48 |
| 2,851,596 | 9/58 | Hilton | 328—48 |
| 2,905,746 | 9/59 | Wampach | 178—4.1 |
| 2,912,485 | 11/59 | Kaufman et al. | 178—4.1 |

ROBERT H. ROSE, *Primary Examiner.*

NEWTON LOVEWELL, *Examiner.*